UNITED STATES PATENT OFFICE.

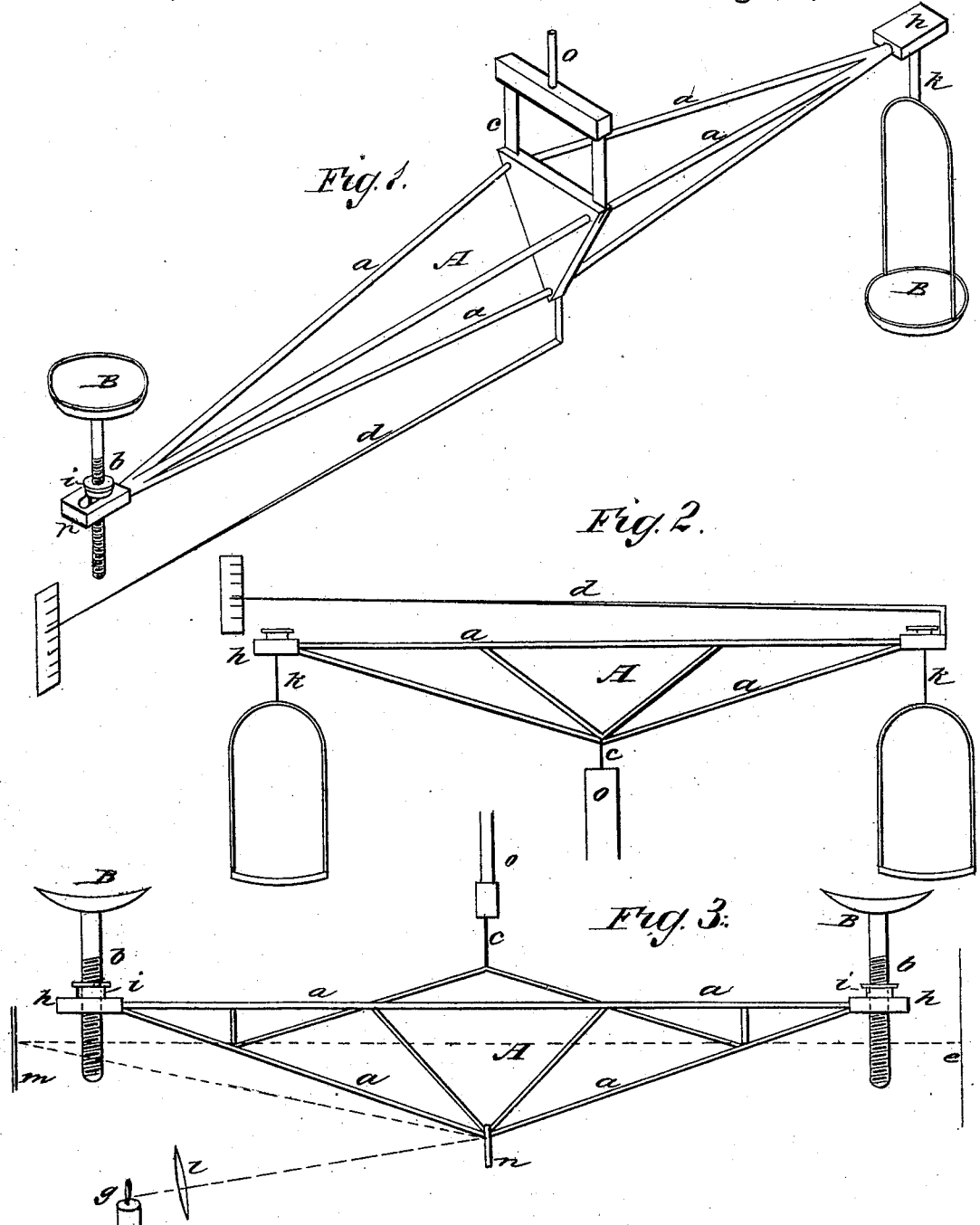

ARTHUR V. ABBOTT, OF BROOKLYN, NEW YORK.

BALANCE-SCALE.

SPECIFICATION forming part of Letters Patent No. 246,057, dated August 23, 1881.

Application filed March 21, 1881. (No model.)

*To all whom it may concern:*

Be it known that I, ARTHUR V. ABBOTT, of Brooklyn, in the county of Kings and State of New York, have invented a new and useful Improvement in Balances; and to enable those skilled in the art to make and use the same, I now fully and particularly describe my said invention, having reference to the accompanying drawings, in which—

Figure 1 shows an isometric projection of my suspended balance as in use, with two methods of attaching the scale-pans. Fig. 2 shows an elevation of my supported balance particularly adapted to weighing assay-buttons. Fig. 3 shows an elevation of a balance designed for general laboratory work.

Similar letters of reference indicate corresponding parts.

Prior to my invention it has been customary in the manufacture of balances to cut a rhombohedral frame from solid metal for the scale-beam. This frame is mounted on hardened-steel knife-edges, which bear on corresponding plates of a gate or other hard material, in order to reduce friction to a minimum. From each end of the frame are suspended on similar knife-edge bearings the scale-pans. Considerable time and expense are involved in thus cutting a beam from solid metal, and when complete it often lacks the vertical and horizontal stiffness requisite to a good balance; or, when made sufficiently solid to have the necessary stiffness, the beam is very heavy and presents too much inertia for delicate weighing; also, the knife-edges rapidly become dull from wear and the corrosive action of laboratory fumes, and render the balance unreliable. The scale-pans are suspended so as to hang some distance below the center of suspension of the scale-beam, so that if the unloaded balance be adjusted so that the center of gravity shall fall at or slightly below the center of suspension when it is loaded the center of gravity will be on a line nearly on a level with the scale-pans and much farther below the center of suspension, thus materially impairing the delicacy of the balance. The long pointer or indicator for rendering visible the slight motions of the scale-beam is so arranged as to occupy considerable room, and thus render necessary a large and bulky case.

My invention is designed to obviate the above defects in scale-beams, and is as follows, reference being had to the drawings:

The scale-beam A, made by arranging fine steel wires $a$ in any of the known forms of trussing, so as to secure the requisite lateral and horizontal stiffness, as shown in Figs. 1, 2, and 3. The size of the wire and the form of the truss depend only on the use to which the balance is to be subjected, and may be varied to suit every case. After the truss A is completed it may be plated with any desired metal or coated with any preservative substance, in order to prevent corrosion.

The beam is sustained by any convenient support, $o$, on one or more thin and narrow strips, $c c$, of metal. The strips $c$ of metal take the place of knife-edges and obviate all objections to which the knife-edges are open, as follows:

When unequal weights are placed in the scale-pans the heavier weight tends to sink, and in so doing to turn the scale-beam about its center of suspension. To do this in the ordinary balance the friction of the knife-edges must be overcome, while in my balance the molecular resistance of flexure in the strips is the only opposition offered, and by making the strips thin this can be reduced to a minimum. Again, the repetition of the flexure produces no wear in the strips, and by making them of gold or platinum or by plating or covering them by any non-corrosive substance the balance is made indestructible by corrosion and durable for use.

Instead of suspending the beam from a support placed above, as shown in Figs. 1 and 3, the balance may be supported by one or more strips placed beneath it, as shown in Fig. 2. I prefer to set the scale-pans B on threaded rods $b$ $b$, as in Figs. 3 and 1, carried by movable nuts $i$ $i$, that are fitted in slots in the blocks $h$ $h$ set at the ends of the beam. By means of the movable nuts the distance of the scale-pans from the center of suspension can be varied, while by means of the threaded rods the center of gravity of the entire balance and its load can be brought as nearly as may be desired to the center of suspension. If, however, it is desired to suspend the scale-pans in the manner usually adopted, each pan may be suspended from its movable nut by one or more strips, similar to those used to sustain the entire balance, as shown in Figs. 1 and 2 at k k.

In order to economize space the pointer or indicator is arranged to extend horizontally, as shown at d in Figs. 1 and 2, or in some similar manner. If very great delicacy and accuracy are required, I prefer to dispense with the pointer entirely and substitute in its place a beam of light and system of reflecting mirrors, as in Fig. 3. g is any source of light, from which, by means of a lens and slit at l, a small parallel beam may be obtained. A small mirror is set on the balance at n, and a larger one on the case at m, and then, after making two reflections, as shown by the dotted lines g, u, n, m, and m e, the beam is received on a scale at e. By this means the slightest movement of the balance is made apparent.

I do not limit myself to any particular form of truss or to any particular material; neither do I limit myself to the number, form, size, or material of the sustaining-strips.

Having thus fully described my invention, I claim as new and desire to secure by Letters Patent—

1. In balances, a beam sustained by one or more flexible metallic strips rigidly attached to the beam and their support, substantially as shown and described.

2. The scale-pans B, screw-rods b, and nuts i, in combination with a scale-beam having slotted ends h, substantially as shown and described.

ARTHUR V. ABBOTT.

Witnesses:
 GEO. D. WALKER,
 C. SEDGWICK.